(12) United States Patent
Ju et al.

(10) Patent No.: US 10,901,274 B2
(45) Date of Patent: Jan. 26, 2021

(54) DISPLAY PANEL, DISPLAY DEVICE AND METHOD OF MANUFACTURING DISPLAY PANEL

(71) Applicant: BOE TECHNOLOGY GROUP CO., LTD., Beijing (CN)

(72) Inventors: Changcheng Ju, Beijing (CN); Long Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 324 days.

(21) Appl. No.: 15/775,284

(22) PCT Filed: Oct. 12, 2017

(86) PCT No.: PCT/CN2017/105841
§ 371 (c)(1),
(2) Date: May 10, 2018

(87) PCT Pub. No.: WO2018/176797
PCT Pub. Date: Oct. 4, 2018

(65) Prior Publication Data
US 2020/0233253 A1    Jul. 23, 2020

(30) Foreign Application Priority Data
Mar. 29, 2017    (CN) .......................... 2017 1 0198368

(51) Int. Cl.
*G02F 1/1343*    (2006.01)
*G02F 1/1362*    (2006.01)
*G02F 1/1333*    (2006.01)

(52) U.S. Cl.
CPC ........ *G02F 1/13439* (2013.01); *G02F 1/1333* (2013.01); *G02F 1/136286* (2013.01)

(58) Field of Classification Search
CPC ............... G02F 1/1333; G02F 1/13439; G02F 1/136286
See application file for complete search history.

(56) References Cited

U.S. PATENT DOCUMENTS 7,342,246 B2 *    3/2008    Sugiura ............... H01L 51/5262
257/40
8,159,635 B2    4/2012    Toyama et al.
(Continued)

FOREIGN PATENT DOCUMENTS

CN    101398553 A    4/2009
CN    102830526 A    12/2012
(Continued)

OTHER PUBLICATIONS

International Search Report and Written Opinion for International Appl. No. PCT/CN2017/105841, dated Dec. 28, 2017.
(Continued)

*Primary Examiner* — Dung T Nguyen
(74) *Attorney, Agent, or Firm* — Dinsmore & Shohl LLP

(57) ABSTRACT

The present disclosure relates to a display panel, a display device, and a method of manufacturing a display panel. The display panel comprises a first substrate and a second substrate arranged opposite to each other, and a liquid crystal layer interposed between the first substrate and the second substrate. The first substrate comprises a first transparent base substrate, and a first transparent electrode layer arranged on a side of the first transparent base substrate close to the liquid crystal layer. The first transparent electrode layer comprises a group of first transparent electrode wires extending along a first direction. The second substrate comprises a second transparent base substrate, and a second transparent electrode layer arranged on a side of the second transparent base substrate close to the liquid crystal layer.
(Continued)

The second transparent electrode layer comprises a group of second transparent electrode wires extending along a second direction.

17 Claims, 4 Drawing Sheets

(56) References Cited

U.S. PATENT DOCUMENTS

2010/0328584 A1    12/2010  Toyama et al.
2018/0164647 A1*    6/2018  Du ........................ H01L 27/124

FOREIGN PATENT DOCUMENTS

| CN | 103273738 A | 9/2013 |
| CN | 103293738 A | 9/2013 |
| CN | 103345016 A | 10/2013 |
| CN | 105869598 A | 8/2016 |
| CN | 105954933 A | 9/2016 |
| CN | 106154661 A | 11/2016 |
| CN | 106950759 A | 7/2017 |

OTHER PUBLICATIONS

First Office Action for CN Appl. No. 201710198368.7, dated Feb. 15, 2019.
Second Office Action for CN Appl. No. 201710198368.7, dated Jun. 24, 2019.

* cited by examiner

DISPLAY PANEL, DISPLAY DEVICE AND METHOD OF MANUFACTURING DISPLAY PANEL

CROSS-REFERENCE TO RELATED APPLICATIONS

The present application claims priority under 35 U.S.C. § 371 to International Patent Application No. PCT/CN2017/105841 filed on Oct. 12, 2017, which claims priority to Chinese Patent Application No. 201710198368.7 filed on Mar. 29, 2017, the disclosure of each of which is incorporated into the present disclosure by reference for all purposes.

TECHNICAL FIELD

The present disclosure relates to a display panel, a display device, a method of manufacturing a display panel, and a method for driving a display panel.

BACKGROUND

With the development of display technologies, all kinds of new technologies are emerging, wherein the transparent display technology is getting more and more attentions. A transparent display device is generally a display device that can form a transparent display state so that a viewer can view display images in the display device and a scene behind the display device.

SUMMARY

One or more embodiments of the present disclosure provides a display panel, a display device, a method of manufacturing a display panel, and a method for driving a display panel.

One or more embodiments of the present disclosure provides a display panel comprising a first substrate and a second substrate arranged opposite to each other, and a liquid crystal layer interposed between the first substrate and the second substrate, wherein:
the liquid crystal layer comprises a reticulate body and liquid crystal molecules distributed in meshes of the reticulate body;
the first substrate comprises a first transparent base substrate, and a first transparent electrode layer arranged on a side of the first transparent base substrate close to the liquid crystal layer, wherein the first transparent electrode layer comprises a group of first transparent electrode wires extending along a first direction, and each of the group of the first transparent electrode wires comprises a plurality of first transparent electrode portions, and a first transparent connecting portion connecting adjacent first transparent electrode portions;
the second substrate comprises a second transparent base substrate, and a second transparent electrode layer arranged on a side of the second transparent base substrate close to the liquid crystal layer, wherein the second transparent electrode layer comprises a group of second transparent electrode wires extending along a second direction, and each of the group of the second transparent electrode wires comprises a plurality of second transparent electrode portions, and a second transparent connecting portion connecting adjacent second transparent electrode portions, wherein the second transparent electrode portions of the group of the second transparent electrode wires face the first transparent electrode portions of the group of the first transparent electrode wires, respectively.

In an example, projections of the second transparent electrode portions of the group of the second transparent electrode wires on the first or second transparent base substrate overlap projections of the first transparent electrode portions of the group of the first transparent electrode wires on the first or second transparent base substrate, respectively.

In one or more embodiments, the first transparent electrode layer and the second transparent electrode layer are made of indium tin oxides, graphene, nano-silver or nano-carbon.

In the display panel provided by one or more embodiments of this disclosure, the first transparent base substrate, the first transparent electrode layer, the second transparent base substrate and the second transparent electrode layer all adopt transparent materials. As compared with conventional technologies, the display panel does not need the arrangement of opaque structural layers such as gate lines, data lines and thin film transistors, thereby increasing light transmittance of the display device and improving the effect of transparent display. As compared with conventional technologies, the back side of the display panel does not need the arrangement of a light guide plate, so the thickness is reduced and light utilization is increased. Furthermore, the structure of the first substrate is simplified, so that the manufacturing process is simpler and the production cost is lower.

In one or more embodiments, refractive indexes of both the first transparent base substrate and the second transparent base substrate are less than a refractive index of the liquid crystal layer. By using this solution, light rays emitted from the light source into the display panel are totally reflected back and forth between the first transparent base substrate and the second transparent base substrate, thereby reducing loss of light and improving light utilization.

In one or more embodiments, a refractive index of the first transparent electrode layer is in a range of about 1.34~2.06, and a refractive index of the second transparent electrode layer is in a range of about 1.34~2.06.

Alternatively, the group of the first transparent electrode wires have the same driving voltage, and differences between driving voltages of the group of the second transparent electrode wires and driving voltages of the group of the first transparent electrode wires decreases or increases sequentially. In this embodiment, an electric field between the first transparent electrode portion and the second transparent electrode portion gradually increases in a direction away from the light source, such that the light transmittance of the liquid crystal layer in the direction away from the light source gradually increases, which can compensate the loss of light and make brightness of the display panel more evenly.

In one or more embodiments, driving voltages of the group of the second transparent electrode wires form an arithmetic sequence.

In one or more embodiments, a thickness of the first transparent electrode layer is in a range of about 40~300 nm and a thickness of the second transparent electrode layer is in a range of about 40~300 nm. The first transparent electrode layer and the second transparent electrode layer with such thicknesses have better light transmittance and moderate thickness, and the display panel has a better transparent display effect.

In one or more embodiments, a thickness of the first transparent base substrate is in a range of about 0.2~1.0 mm and a thickness of the second transparent base substrate is in a range of about 0.2~1.0 mm. The first transparent base substrate and the second transparent base substrate with such thicknesses have better light transmittance and moderate thickness, and the display panel has a better transparent display effect.

In one or more embodiments, the liquid crystal layer comprises a reticulate body and liquid crystal molecules distributed in meshes of the reticulate body. By using such a structural design, the liquid crystal molecules are distributed in the meshes of the reticulate body. When an electric field is generated between the first transparent electrode portion and the second transparent electrode portion, the liquid crystal molecules are deflected. Due to restrictions of the meshes in the reticulate body, the deflecting alignments of the liquid crystal molecules are comparatively muddled, so that scattering of the liquid crystal molecules with respect to the light rays can be improved, thereby improving light transmittance of the liquid crystal layer.

One or more embodiments of this disclosure further provides a display device comprising the display panel according to any of the preceding technical solutions, and a light source arranged on a side of the display panel.

In the display device provided according to the embodiment, the display panel does not need the arrangement of opaque structural layers such as gate lines, data lines and thin film transistors. As compared with conventional technologies, the light transmittance of the display device is increased, the transparent display effect is improved. Furthermore, the display device has a simplified structure, a smaller thickness and a higher light utilization.

One or more embodiments of the present disclosure further provides a method of manufacturing a display panel comprising:

forming a first substrate, comprising: forming a first transparent electrode layer on a first transparent base substrate, wherein the first transparent electrode layer comprises a group of first transparent electrode wires extending along a first direction, and each of the group of the first transparent electrode wires comprises a plurality of first transparent electrode portions, and a first transparent connecting portion connecting adjacent first transparent electrode portions;

forming a second substrate, comprising: forming a second transparent electrode layer on a second transparent base substrate, wherein the second transparent electrode layer comprises a group of second transparent electrode wires extending along a second direction, and each of the group of the second transparent electrode wires comprises a plurality of second transparent electrode portions, and a second transparent connecting portion connecting an adjacent second transparent electrode, wherein the second transparent electrode portions of the group of the second transparent electrode wires face the first transparent electrode portions of the group of the first transparent electrode wires, respectively;

manufacturing the first substrate, the second substrate and a liquid crystal layer into a liquid crystal cell, wherein the liquid crystal layer comprises a reticulate body and liquid crystal molecules distributed in meshes of the reticulate body.

The display panel manufactured by using the method according to one or more embodiments of this disclosure has improved light transmittance and a better transparent display effect. Since it is not needed to manufacture opaque structure layers such as gate lines, data lines and thin film transistors, the manufacturing process is simpler.

In one or more embodiments, projections of the second transparent electrode portions of the group of the second transparent electrode wires on the first or second transparent base substrate overlap projections of the first transparent electrode portions of the group of the first transparent electrode wires the first or second transparent base substrate, respectively.

In one or more embodiments, the first transparent electrode layer and the second transparent electrode layer are made of indium tin oxides, graphene, nano-silver or nano-carbon.

In one or more embodiments, manufacturing the first substrate, the second substrate and a liquid crystal layer into a liquid crystal cell comprises:

mixing the reticulate body, the liquid crystal molecules and a photosensitive agent; heating the reticulate body, liquid crystal molecules and photosensitive agent; and manufacturing the liquid crystal cell from the reticulate body, the liquid crystal molecules, and the photosensitive agent and the first substrate and the second substrate.

In the liquid crystal cell manufactured by using the method, the liquid crystal molecules are distributed in the meshes of the reticulate body. When an electric field is generated between the first transparent electrode portion and the second transparent electrode portion, the liquid crystal molecules are deflected. Due to restrictions of the meshes in the reticulate body, the deflecting alignments of the liquid crystal molecules are comparatively muddled, so that scattering of the liquid crystal molecules with respect to the light rays can be improved, thereby improving light transmittance of the liquid crystal layer.

In one or more embodiments, the manufacturing method further comprises:

adjusting a refractive index of the first transparent electrode layer after forming the first transparent electrode layer on the first transparent base substrate;

adjusting a refractive index of the second transparent electrode layer after forming the second transparent electrode layer on the second transparent base substrate.

By adjusting the refractive indexes of the first transparent electrode layer and the second transparent electrode layer, the scattering of the light rays on an interface between the transparent base substrate and the transparent electrode layer, and an interface between the liquid crystal layer and the transparent electrode layer can be reduced, thereby increasing the transparent display effect of the display panel.

Alternatively, adjusting the refractive index of the first transparent electrode layer comprises: performing a first annealing treatment on the first transparent electrode layer.

Adjusting the refractive index of the second transparent electrode layer comprises performing a second annealing treatment on the second transparent electrode layer. The first transparent layer and the second transparent electrode layer after the first annealing treatment and the second annealing treatment have better refractive indexes, which can improve the light transmittance of the display panel.

In one or more embodiments, the first annealing treatment and the second annealing treatment are under a temperature in a range of about 200~400° C. with a duration in a range of about 15~120 minutes.

One or more embodiments of the present disclosure further provides a method for driving the display panel as stated above, the method comprising:

providing a first plurality of driving voltages to the group of the first transparent electrode wires, wherein the first plurality of driving voltages are identical with each other; and providing a second plurality of driving voltages to the group of the second transparent electrode wires, wherein differences between respective ones of the first plurality of driving voltage and respective ones of the second plurality of driving voltages decrease or increase sequentially in a direction away from a light source for the display panel.

In one or more embodiments, the second plurality of driving voltages form an arithmetic sequence.

DETAILED DESCRIPTION

A basic structure of a common transparent display device comprises a transparent display panel, a light guide plate located on a back side of the transparent display panel, and a light source located on a light entry side of the light guide plate. The transparent display panel comprises first and second substrates arranged opposite to each other, and a liquid crystal layer interposed between the first substrate and the second substrate. The first substrate comprises a first transparent base substrate, and a gate line, a data line, a thin film transistor (TFT for short) and a pixel electrode located on a side of the first transparent base substrate close to the liquid crystal layer; the second substrate comprises a second transparent base substrate, and a common electrode located on a side of the second transparent base substrate close to the liquid crystal layer.

The operating principle of a transparent display device is that: light rays emitted from the light source are guided by the light guide plate and then are incident into the transparent display panel, and the electric field generated between the pixel electrode of the first substrate and the common electrode of the second substrate spatially rearrange the liquid crystal molecules, thereby changing the propagating direction of the incident light, such that an image can be displayed.

The above technology has the following defects: the first substrate needs the arrangement of opaque structural layers such as gate lines, data lines and thin film transistors, and for a self-light-emitting display device, charge injection needs the arrangement of components such as metal electrodes, thereby resulting in low light transmittance of the transparent display device and poor transparent display effect; in addition, many wirings are designed on the first substrate, thereby resulting in a complex structure and a more fussy manufacturing process.

One or more embodiments of the present disclosure provides a display panel, a display device, and a method of manufacturing a display panel, which increases the light transmittance of the display device and improves the transparent display effect. One or more embodiments of the present disclosure is described in further detail below in combination with illustrative embodiments.

A liquid crystal cell is a basic component of the display panel, comprising substrates and a liquid crystal layer between the substrates. After the formation of the liquid crystal cell, processes such as bonding are required, and then a circuit board is added to form the liquid crystal cell as a display panel. In this specification, the terms "liquid crystal cell" and "display panel" can be used interchangeably.

Figure 1:
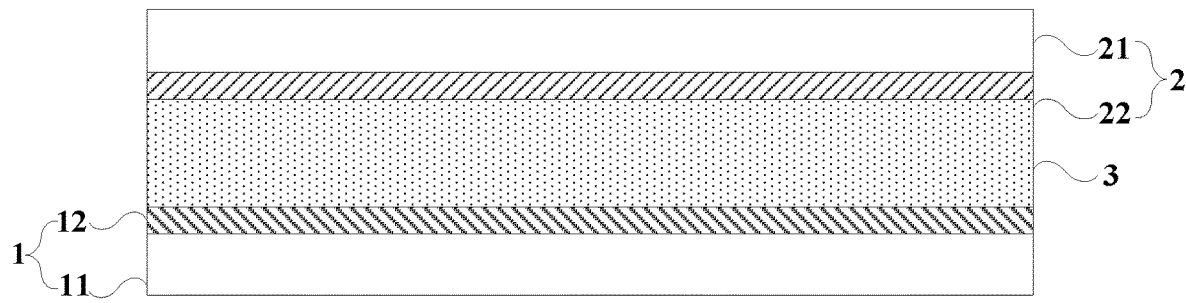
FIG. 1 is a schematic diagram showing a display panel according to an embodiment of the present disclosure.
Figure 2:
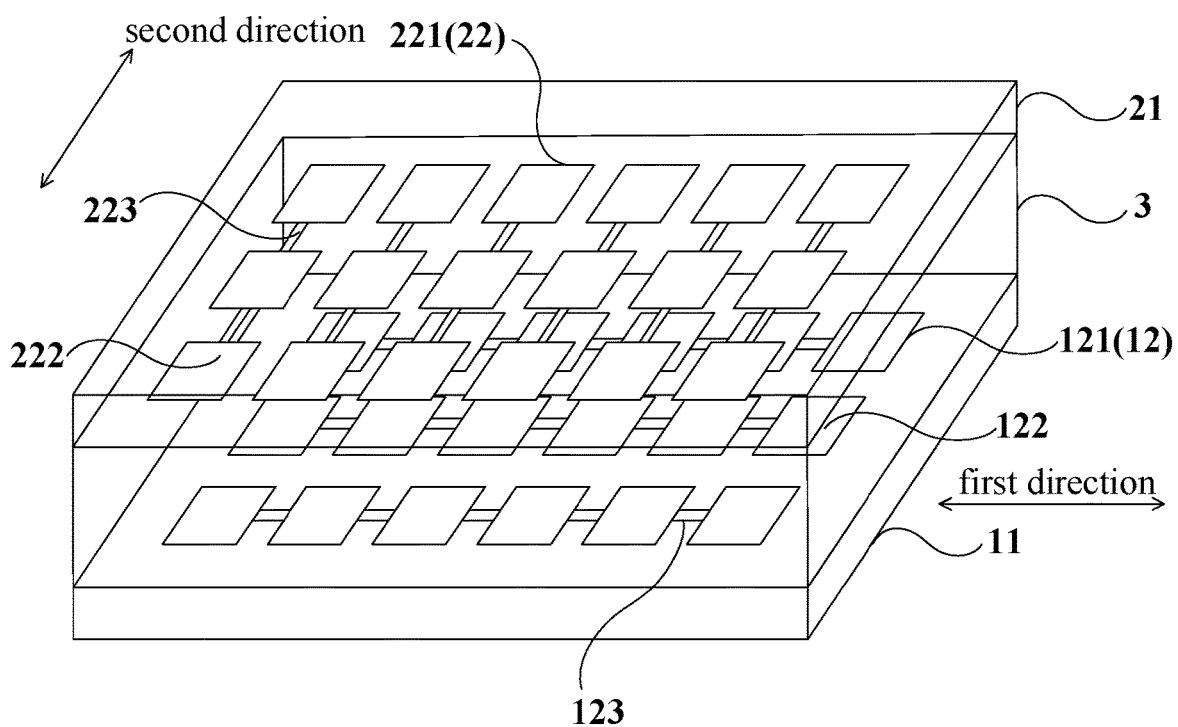
FIG. 2 is a schematic diagram showing a display panel according to another embodiment of the present disclosure.

As shown in FIGS. 1 and 2, one or more embodiments of the present disclosure provides a display panel comprising a first substrate 1 and a second substrate 2 arranged opposite to each other, and a liquid crystal layer 3 interposed between the first substrate 1 and the second substrate 2.

The first substrate 1 comprises a first transparent base substrate 11, and a first transparent electrode layer 12 arranged on a side of the first transparent base substrate 11 close to the liquid crystal layer 3, wherein the first transparent electrode layer 12 comprises a group of first transparent electrode wires 121 extending along a first direction (as shown in FIG. 2), and each of the group of the first transparent electrode wires 121 comprises a plurality of first transparent electrode portions 122, and a first transparent connecting portion 123 connecting adjacent first transparent electrode portions 122.

The second substrate 2 comprises a second transparent base substrate 21, and a second transparent electrode layer 22 arranged on a side of the second transparent base substrate 21 close to the liquid crystal layer 3, wherein the second transparent electrode layer 22 comprises a group of second transparent electrode wires 221 extending along a second direction (as shown in FIG. 2), and each of the group of the second transparent electrode wires 221 comprises a plurality of second transparent electrode portions 222, and a second transparent connecting portion 223 connecting adjacent second transparent electrode portions 222, wherein the second transparent electrode portions 222 of the group of the second transparent electrode wires 221 face the first transparent electrode portions 122 of the group of the first transparent electrode wires 121, respectively.

In the display panel provided by one or more embodiments of this disclosure, the first transparent base substrate 11, the first transparent electrode layer 12, the second transparent base substrate 21 and the second transparent electrode layer 22 all adopt transparent materials. As compared with conventional technologies, the display panel does not need the arrangement of opaque structural layers such as gate lines, data lines and thin film transistors, thereby increasing light transmittance of the display device and improving the effect of transparent display. As compared with conventional technologies, the back side of the display panel does not need the arrangement of a light guide plate, so the thickness is reduced and light utilization is increased. Furthermore, the structure of the first substrate 1 is simplified, so that the manufacturing process is simpler and the production cost is lower.

As shown in FIG. 2, in the present embodiment, the first transparent electrode layer 12 comprises a group of first transparent electrode wires 121 extending along the first direction, and a second transparent electrode layer 22 comprises a group of second transparent electrode wires 221 extending along the second direction perpendicular to the first direction, and the second transparent electrode portions 222 face the corresponding first transparent electrode portions 122, respectively, which avoid crossing of electric signals of the first transparent electrode layer 12 and the second transparent electrode layer 22, and improve the display effect. The specific types of the first transparent electrode layer 12 and the second transparent electrode layer 22 are not limited. For example, the first transparent electrode layer 12 is a pixel electrode and the second transparent electrode layer 22 is a common electrode; or the first transparent electrode layer 12 is a common electrode and the second transparent electrode layer 22 is a pixel electrode.

In one or more embodiments, refractive indexes of both the first transparent base substrate 11 and the second transparent base substrate 21 are less than a refractive index of the liquid crystal layer 3. By using this solution, light rays emitted from the light source into the display panel are totally reflected back and forth between the first transparent base substrate 11 and the second transparent base substrate 21, thereby reducing loss of light and improving light utilization.

In the present embodiment, a refractive index of the first transparent electrode layer 12 may be in a range of about 1.34~2.06, and a refractive index of the second transparent electrode layer 22 may be in a range of about 1.34~2.06. The first transparent electrode layer 12 and the second transparent electrode layer 22 with such refractive indexes have a better light extraction efficiency, thereby improving light utilization. In one embodiment of the present application, the first transparent electrode layer 12 and the second transparent electrode layer 22 with a refractive index of 1.66 are adopted.

Figure 3:
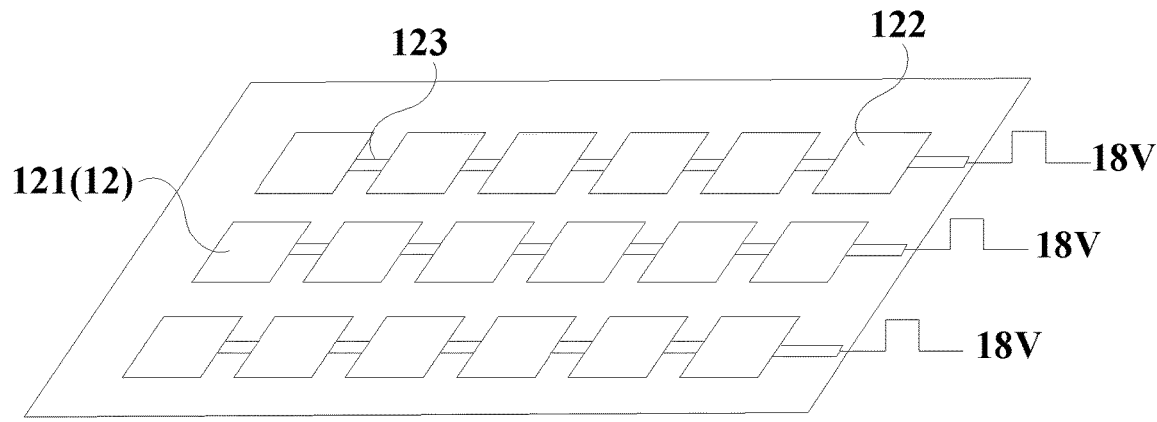
FIG. 3 is a schematic diagram showing a first transparent electrode layer according to an embodiment of the present disclosure.
Figure 4:
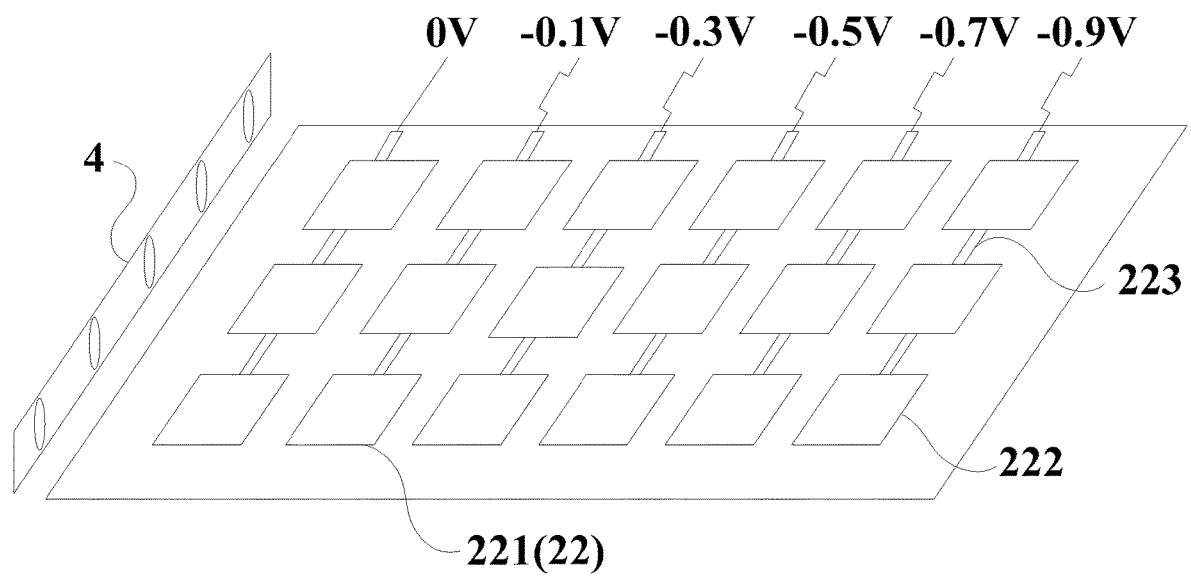
FIG. 4 is a schematic diagram showing a second transparent electrode layer according to an embodiment of the present disclosure.

Light rays incident to the display panel will decrease gradually in a direction away from the light source, as a result, the display panel has a poor evenness on brightness. In one or more embodiments of the present disclosure, the group of the first transparent electrode wires 121 have the same driving voltage, and differences between driving voltages of the group of the second transparent electrode wires 221 and driving voltages of the group of the first transparent electrode wires 121 decrease or increase sequentially. In an embodiment of the present disclosure, a group of first transparent electrode wires 121 on the first transparent base substrate 11 input in turn pulse signals in a voltage range of 0~18 v, as shown in FIG. 3, and a group of second transparent electrode wires 221 on the second transparent base substrate 21 input in turn pulse signals with peak voltages of 0V, −0.1V, −0.3V, −0.5V, −0.7V and −0.9V, as shown in FIG. 4. The light source 4 is arranged at an end of the display panel close to a minimal voltage difference between the first transparent electrode portion 122 and the second transparent electrode portion 222, that is, the display panel is close to an end of the second transparent electrode wire 221 which inputs the driving voltage with a peak value of 0V. In this way, an electric field between the first transparent electrode portion 122 and the second transparent electrode portion 222 gradually increases in a direction away from the light source 4, such that the light transmittance of the liquid crystal layer 3 in the direction away from the light source 4 gradually increases, which can compensate the loss of light and make brightness of the display panel more evenly. In one or more embodiments, the driving voltages of the group of the second transparent electrode wires 221 form an arithmetic sequence. In an embodiment of the present disclosure, the driving voltages of the group of the second transparent electrode wires 221 are data driving voltages, and the input voltages of the group of the first transparent electrode wires 121 are gate driving voltages.

In the embodiments of the present disclosure, due to the effect of carrier concentration and lattice optimization, the refractive indexes of the first transparent electrode layer 12 and the second transparent electrode layer 22 gradually decrease with the increase of the thicknesses of the first transparent electrode layer 12 and the second transparent electrode layer 22. However, overlarge thicknesses of the first transparent electrode layer 12 and the second transparent electrode layer 22 will increase the extinction coefficient and reduce the transmittance. In one or more embodiments, a thickness of the first transparent electrode layer 12 is in a range of about 40~300 nm and a thickness of the second transparent electrode layer 22 is in a range of about 40~300 nm. The first transparent electrode layer 12 and the second transparent electrode layer 22 with such thicknesses have better light transmittance and moderate thickness, and the display panel has a better transparent display effect. For example, in an embodiment of the present disclosure, the first transparent electrode layer 12 and the second transparent electrode layer 22 select the thickness of 200 nm.

The specific types of the materials for the first transparent electrode layer 12 and the second transparent electrode layer 22 are not limited. For example, the materials may be indium tin oxides, graphene, nano-silver or nano-carbon.

Furthermore, in one or more embodiments of the present disclosure, a thickness of the first transparent base substrate 11 is in a range of about 0.2~1.0 mm and a thickness of the second transparent base substrate 21 is in a range of about 0.2~1.0 mm. The first transparent base substrate 11 and the second transparent base substrate 21 with such thicknesses have better light transmittance and moderate thickness, and the display panel has a better transparent display effect.

The specific types of the materials for the first transparent base substrate 11 and the second transparent base substrate 21 are not limited. For example, the materials may be glass, polyimide, polyethylene or polyethylene terephthalate.

Figure 5:
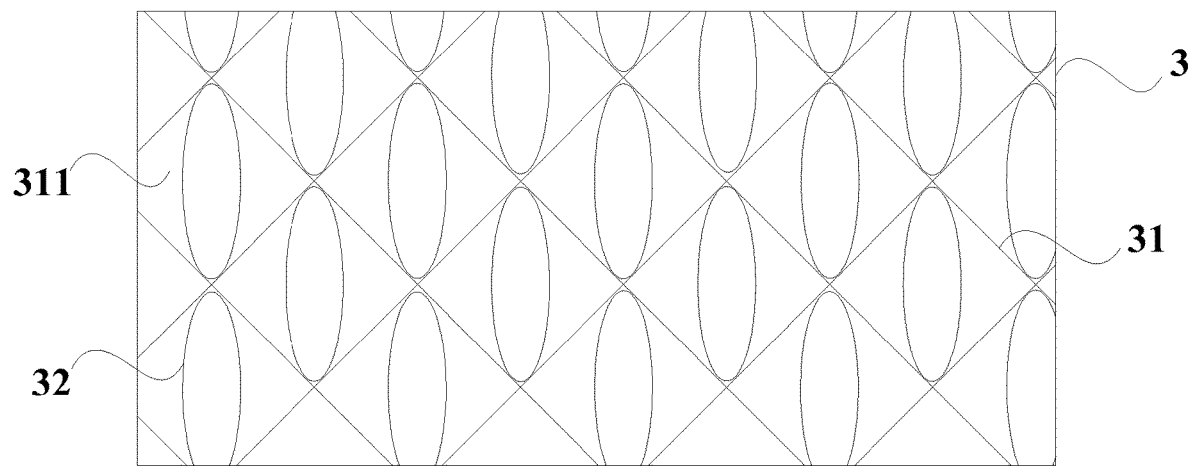
FIG. 5 is a schematic diagram showing a liquid crystal layer of a display panel according to one or more embodiments of the present disclosure.
Figure 6:
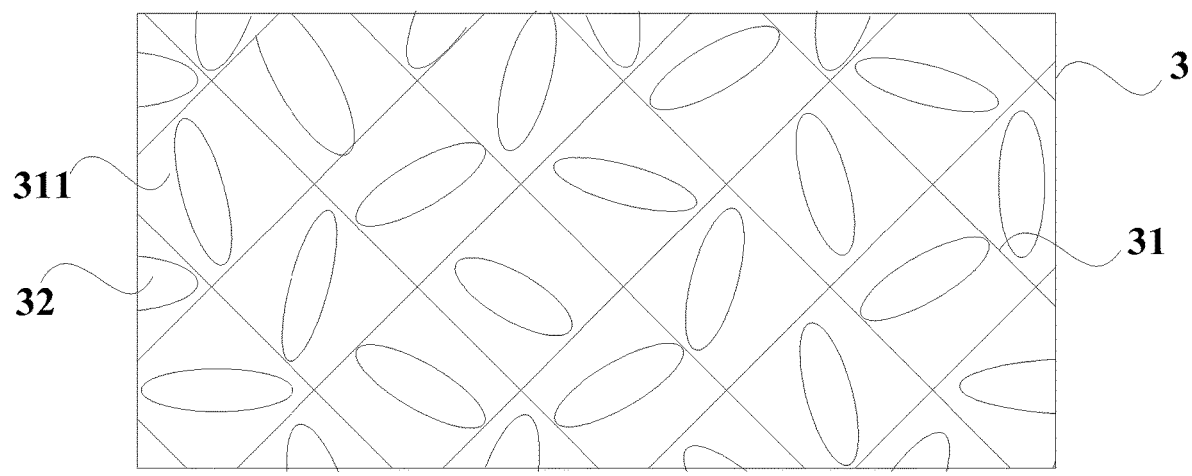
FIG. 6 is another schematic diagram showing a liquid crystal layer of a display panel according to one or more embodiments of the present disclosure.

As shown in FIG. 5, in an alternative embodiment of present disclosure, the liquid crystal layer 3 comprises a reticulate body 31 and liquid crystal molecules 32 distributed in meshes 311 of the reticulate body 31. As shown in FIG. 6, when an electric field is generated between the first transparent electrode portion 122 and the second transparent electrode portion 222, the liquid crystal molecules are deflected; since the liquid crystal molecules 32 are distributed in the meshes of the reticulate body 31, due to the restrictions of the meshes 311 in the reticulate body 31, the deflecting alignments of the liquid crystal molecules 32 are comparatively muddled, so that scattering of the liquid crystal molecules 32 with respect to the light rays can be improved, thereby improving light transmittance of the liquid crystal layer 3.

In the present embodiment, the specific type of the reticulate body 31 is not limited. For example, it may be a polymer reticulate body, and the polymer reticulate body may be polyacrylate reticulate body, polyurethane reticulate body, polyether reticulate body or epoxy resin reticulate body.

In an alternative embodiment of the present disclosure, the display panel further comprises a first alignment layer between the first transparent base substrate 11 and the liquid crystal layer 3, and a second alignment layer between the second transparent base substrate 21 and the liquid crystal layer 3. When there is no electric field between the first transparent electrode portion 122 and the second transparent electrode portion 222, the first alignment layer and the second alignment layer can guide the liquid crystal molecules 32 in the liquid crystal layer 3 to restore their original arrangement state.

In one or more embodiments of the present disclosure, specifically, the display panel is a waveguide display panel of a passive driving mode. The first transparent electrode layer 12 and the second transparent electrode layer 22 adopt an indium tin oxide material, with a refractive index of 1.66 and a thickness of 200 nm, wherein, the first transparent electrode layer 12 is a pixel electrode, and the second transparent electrode layer 22 is a common electrode. The liquid crystal layer 3 is a polymer stabilized liquid crystal, comprising a polymer reticulate body and liquid crystal molecules 32 distributed in meshes 311 of the polymer reticulate body. The display panel has a smaller thickness, higher light utilization and better light transmittance. Moreover, the display panel has a simplified structure, a simpler manufacturing process and a lower production cost.

One or more embodiments of the present disclosure further provides a display device comprising the display panel according to any of the preceding technical solutions, and a light source arranged on a side of the display panel.

In an alternative embodiment of the present disclosure, the display device further comprises a condenser arranged on a light exit side of the light source. Light rays emitted from the light source pass through the condenser, such that their angles incident to the display panel are adjusted, whereby the light rays are gathered and incident into the display panel, thereby increasing the light utilization.

In the display device provided according to one or more embodiments of the present disclosure, after the light rays are incident to the display panel, they are totally reflected between the first transparent base substrate and the second transparent base substrate. When a driving voltage is inputted to the first transparent electrode layer and the second transparent electrode layer of the display panel, the liquid crystal molecules in the liquid crystal layer are deflected under the action of the electric field between the first transparent electrode layer and the second transparent electrode layer, thereby changing the light propagating direction of and scattering the light out of the display panel to display the image.

In the display device provided according to the embodiment, the display panel does not need the arrangement of opaque structural layers such as gate lines, data lines and thin film transistors. As compared with conventional technologies, the light transmittance of the display device is increased, the transparent display effect is improved. Furthermore, the display device has a simplified structure, a smaller thickness and a higher light utilization.

In the present embodiment, the specific type of the display device is not limited, and for example, it may be a transparent display, a transparent display window, a transparent indicator, and etc.

Figure 7:
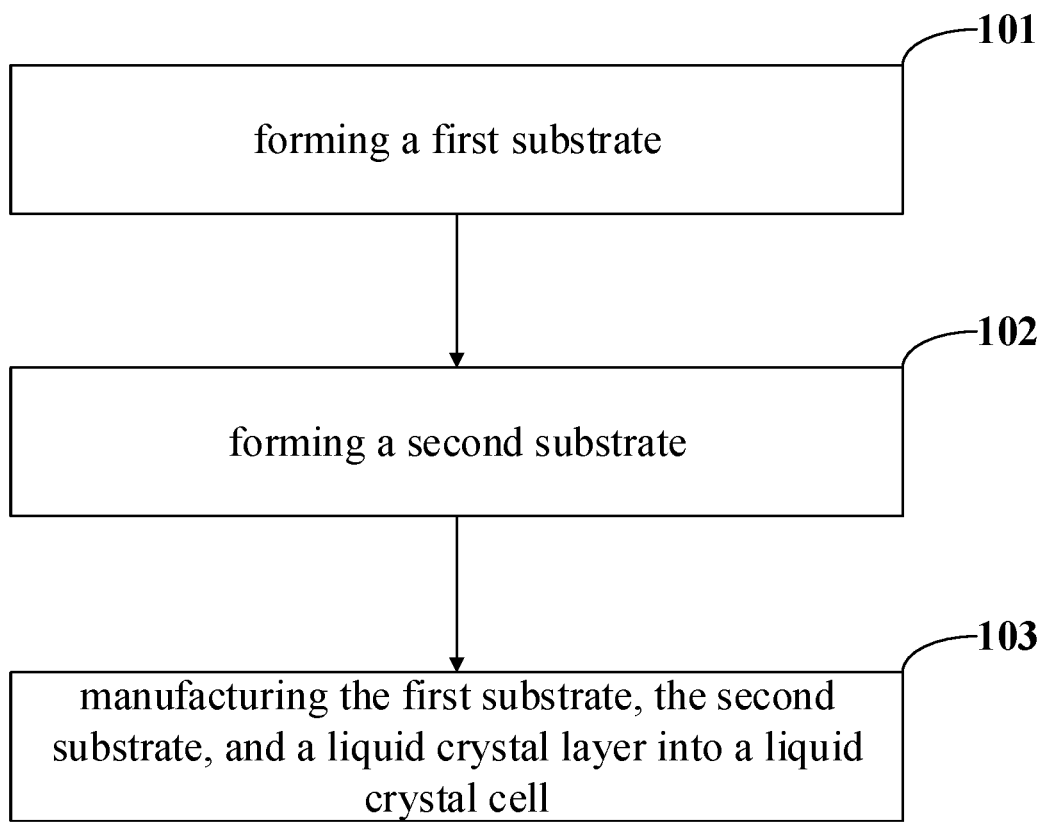
FIG. 7 is a flowchart schematic diagram showing a method of manufacturing a display panel according to one or more embodiments of the present disclosure.

As shown in FIG. 7, one or more embodiments of the present disclosure further provides a method of manufacturing a display panel comprising the following steps.

In step 101, a first substrate is formed, comprising: forming a first transparent electrode layer on a first transparent base substrate, wherein the first transparent electrode layer comprises a group of first transparent electrode wires extending along a first direction, and each of the group of the first transparent electrode wires comprises a plurality of first transparent electrode portions, and a first transparent connecting portion connecting adjacent first transparent electrode portions.

In step 102, a second substrate is formed, comprising: forming a second transparent electrode layer on a second transparent base substrate, wherein the second transparent electrode layer comprises a group of second transparent electrode wires extending along a second direction, and each of the group of the second transparent electrode wires comprises a plurality of second transparent electrode portions, and a second transparent connecting portion connecting an adjacent second transparent electrode, wherein the second transparent electrode portions of the group of the second transparent electrode wires face the first transparent electrode portions of the group of the first transparent electrode wires, respectively.

In step 103, the first substrate, the second substrate and liquid crystals are manufactured into a liquid crystal cell.

The display panel manufactured by using the method according to one or more embodiments of this disclosure has improved light transmittance and a better transparent display effect. Since it is not needed to manufacture opaque structure layers such as gate lines, data lines and thin film transistors, the manufacturing process is simpler.

In an alternative embodiment of the present disclosure, the step 101 comprises: forming a first transparent electrode layer on the first substrate by a sputtering method; forming a driving circuit pattern on the first transparent electrode layer by processes such as lithography, etching; forming a first alignment layer on the first transparent electrode layer; performing rubbing alignment for the first alignment layer; and coating a frame seal agent around the first transparent electrode portion and spraying introns.

In an alternative embodiment of the present disclosure, the step 102 comprises: forming a second transparent electrode layer on the second substrate by a sputtering method; forming a driving circuit pattern on the second transparent electrode layer by processes such as lithography, etching; forming a second alignment layer on the second transparent electrode layer; performing rubbing alignment for the second alignment layer; and coating a frame seal agent around the second transparent electrode portion and spraying introns.

The specific method to form the first alignment layer on the first transparent electrode layer and to form a second alignment layer on the second transparent electrode layer is not limited. For example, it can be a spin coating method. In an alternative embodiment of the present disclosure, the spin coating method comprises: coating an alignment agent on the first transparent electrode layer and the second transparent electrode layer, and placing them into a liquid crystal substrate spin-coating machine for spin coating, wherein the rotational speed is set to 2000~3000 with a duration of 100~150 seconds; and putting the first substrate and the second substrate after the spin coating into an oven, wherein the oven is preheated for 20~50 minutes under a temperature of 50~100° C., and then baking the first substrate and the second substrate for several hours under a temperature of 100~300° C.

In an alternative embodiment of the present disclosure, the step 103 comprises the following steps.

In step 201, a reticulate body, liquid crystal molecules and a photosensitive agent are mixed;

In step 202, the reticulate body, liquid crystal molecules and photosensitive agent are heated.

In step 203, the liquid crystal cell are manufactured from the heated reticulate body, liquid crystal molecules, and photosensitive agent and the first substrate and the second substrate.

In an alternative embodiment of the present disclosure, after the completion of the step 203, the step 103 further comprises curing the liquid crystal cell, for example, curing the liquid crystal cell under ultraviolet light.

In the liquid crystal cell manufactured by using this method, when an electric field is generated between the first transparent electrode portion and the second transparent electrode portion, the liquid crystal molecules are deflected; since the liquid crystal molecules are distributed in the meshes of the reticulate body, due to restrictions of the meshes in the reticulate body, the deflecting alignments of the liquid crystal molecules are comparatively muddled, so that scattering of the liquid crystal molecules with respect to the light rays can be improved, thereby improving light transmittance of the liquid crystal layer.

In the present embodiment, the specific type of the photosensitive agent is not limited, and it may be a cationic photosensitive agent, and the cationic photosensitive agent may be diazonium salt, diaryl iodonium salt, triaryl sulfonium salt, alkyl sulfonium salt, iron aromatic salt, sulfonyloxy ketone or triaryl siloxane.

In an embodiment of the present disclosure, the method of manufacturing a display panel further comprises: adjusting a refractive index of the first transparent electrode layer after forming the first transparent electrode layer on the first transparent base substrate; and adjusting a refractive index of the second transparent electrode layer after forming the second transparent electrode layer on the second transparent base substrate. By adjusting the refractive indexes of the first transparent electrode layer and the second transparent electrode layer, the scattering of the light rays on an interface between the transparent base substrate and the transparent electrode layer, and an interface between the liquid crystal layer and the transparent electrode layer can be reduced, thereby reducing the loss of light and increasing light transmittance.

In the embodiment, the specific method for adjusting the refractive indexes of the first transparent electrode layer and the second transparent electrode layer is not limited. For example, it may be an annealing treatment. There is a nonlinear relationship between a temperature for the annealing treatment and the refractive index. As the temperature increases, the refractive indexes of the first transparent electrode layer and the second transparent electrode layer first decrease and then increase. By performing the annealing treatment in a certain period of time, crystal lattices of the first transparent electrode layer and the second transparent electrode layer can be arranged in order to thereby improve the carrier mobility and reduce the refractive index. However, an overlong annealing time will increase the extinction coefficient. In one or more embodiments of this disclosure, the annealing treatment is under a temperature in a range of about 200~400° C. with a duration in a range of about 15~120 minutes. The first transparent layer and the second transparent electrode layer after the annealing treatment have better refractive indexes, which can improve the light transmittance of the display panel.

Evidently, those skilled in the art could make various modifications and variations to the present disclosure without departing from the spirit and scope of the present disclosure. In this way, provided that all these modifications and variations made to the present disclosure fall into the scope of the claims of the present disclosure and their equivalent technologies, the present disclosure also intends to embrace all these modifications and variations.

What is claimed is:

1. A display panel comprising:
    a first substrate and a second substrate arranged opposite to each other, and
    a liquid crystal layer interposed between the first substrate and the second substrate, wherein:
    the liquid crystal layer comprises a reticulate body and liquid crystal molecules distributed in meshes of the reticulate body;
    the first substrate comprises a first transparent base substrate, and a first transparent electrode layer arranged on a side of the first transparent base substrate close to the liquid crystal layer, wherein the first transparent electrode layer comprises a group of first transparent electrode wires extending along a first direction, and each of the group of the first transparent electrode wires comprises a plurality of first transparent electrode portions, and a first transparent connecting portion connecting adjacent electrode portions of the plurality of first transparent electrode portions; and
    the second substrate comprises a second transparent base substrate, and a second transparent electrode layer arranged on a side of the second transparent base substrate close to the liquid crystal layer, wherein the second transparent electrode layer comprises a group of second transparent electrode wires extending along a second direction, and each of the group of the second transparent electrode wires comprises a plurality of second transparent electrode portions, and a second transparent connecting portion connecting adjacent electrode portions of the plurality of second transparent electrode portions, wherein the plurality of second transparent electrode portions of the group of the second transparent electrode wires face the plurality of first transparent electrode portions of the group of the first transparent electrode wires, respectively.

2. The display panel according to claim 1, wherein refractive indexes of both the first transparent base substrate and the second transparent base substrate are less than a refractive index of the liquid crystal layer.

3. The display panel according to claim 1, wherein a refractive index of the first transparent electrode layer is in a range of about 1.34~2.06, and a refractive index of the second transparent electrode layer is in a range of about 1.34~2.06.

4. The display panel according to claim 1, wherein a thickness of the first transparent electrode layer is in a range of about 40~300 nm and a thickness of the second transparent electrode layer is in a range of about 40~300 nm.

5. The display panel according to claim 1, wherein a thickness of the first transparent base substrate is in a range of about 0.2~1.0 mm and a thickness of the second transparent base substrate is in a range of about 0.2~1.0 mm.

6. A display device comprising:
    the display panel according to claim 1; and
    a light source arranged on a side of the display panel.

7. The display panel according to claim 1, wherein projections of the second transparent electrode portions of the group of the second transparent electrode wires on the first transparent base substrate or the second transparent base substrate overlap projections of the first transparent electrode portions of the group of the first transparent electrode wires on the first transparent base substrate or the second transparent base substrate, respectively.

8. The display panel according to claim 1, wherein the first transparent electrode layer and the second transparent electrode layer are made of indium tin oxides, graphene, nano-silver or nano-carbon.

9. A method for driving the display panel according to claim 1, comprising:
providing a first plurality of driving voltages to the group of the first transparent electrode wires, wherein the first plurality of driving voltages are identical with each other; and
providing a second plurality of driving voltages to the group of the second transparent electrode wires,
wherein differences between respective ones of the first plurality of driving voltages and respective ones of the second plurality of driving voltages decrease or increase sequentially in a direction away from a light source for the display panel.

10. The method according to claim 9, wherein the second plurality of driving voltages form an arithmetic sequence.

11. A method of manufacturing a display panel comprising:
forming a first substrate, comprising:
forming a first transparent electrode layer on a first transparent base substrate, wherein the first transparent electrode layer comprises a group of first transparent electrode wires extending along a first direction, and each of the group of the first transparent electrode wires comprises a plurality of first transparent electrode portions, and a first transparent connecting portion connecting adjacent first transparent electrode portions;
forming a second substrate, comprising:
forming a second transparent electrode layer on a second transparent base substrate, wherein the second transparent electrode layer comprises a group of second transparent electrode wires extending along a second direction, and each of the group of the second transparent electrode wires comprises a plurality of second transparent electrode portions, and a second transparent connecting portion connecting an adjacent second transparent electrode, wherein the second transparent electrode portions of the group of the second transparent electrode wires face the first transparent electrode portions of the group of the first transparent electrode wires, respectively; and
manufacturing the first substrate, the second substrate and a liquid crystal layer into a liquid crystal cell, wherein the liquid crystal layer comprises a reticulate body and liquid crystal molecules distributed in meshes of the reticulate body.

12. The method according to claim 11, wherein manufacturing the first substrate, the second substrate and the liquid crystal layer into the liquid crystal cell comprises:
mixing the reticulate body, the liquid crystal molecules and a photosensitive agent;
heating the reticulate body, the liquid crystal molecules and the photosensitive agent; and
manufacturing the liquid crystal cell from the reticulate body, the liquid crystal molecules, and the photosensitive agent and the first substrate and the second substrate.

13. The method according to claim 11, further comprising:
adjusting a refractive index of the first transparent electrode layer after forming the first transparent electrode layer on the first transparent base substrate; and
adjusting a refractive index of the second transparent electrode layer after forming the second transparent electrode layer on the second transparent base substrate.

14. The method according to claim 13, wherein adjusting the refractive index of the first transparent electrode layer comprises performing a first annealing treatment on the first transparent electrode layer, and wherein adjusting the refractive index of the second transparent electrode layer comprises performing a second annealing treatment on the second transparent electrode layer.

15. The method according to claim 14, wherein the first annealing treatment and the second annealing treatment are under a temperature in a range of about 200~400° C. with a duration in a range of about 15~120 minutes.

16. The method according to claim 11, wherein projections of the second transparent electrode portions of the group of the second transparent electrode wires on the first transparent base substrate or the second transparent base substrate overlap projections of the first transparent electrode portions of the group of the first transparent electrode wires the first or second transparent base substrate, respectively.

17. The method according to claim 11, wherein the first transparent electrode layer and the second transparent electrode layer are made of indium tin oxides, graphene, nano-silver or nano-carbon.

* * * * *